United States Patent [19]

Nunemaker et al.

[11] Patent Number: 4,590,331
[45] Date of Patent: May 20, 1986

[54] HOSTAGE NEGOTIATION TELEPHONE SYSTEM

[75] Inventors: Joseph P. Nunemaker, Lanham; Samuel Hicks, New Carollton, both of Md.

[73] Assignee: Security Systems Internationale, Inc., Lanham, Md.

[21] Appl. No.: 588,991

[22] Filed: Mar. 13, 1984

[51] Int. Cl.$^4$ .............................................. H04M 9/00
[52] U.S. Cl. ..................... 179/5 R; 179/29; 179/40
[58] Field of Search ................ 179/2 R, 5 R, 5 P, 29, 179/40, 81 E, 103, 175.1 R, 18 BB, 18 HB

[56] References Cited

U.S. PATENT DOCUMENTS

| | | | |
|---|---|---|---|
| 4,064,366 | 12/1977 | Wheatley et al. | 179/2 R |
| 4,113,985 | 9/1978 | Day | 179/2 R |
| 4,145,577 | 3/1979 | Kojima et al. | 179/18 HB |
| 4,362,908 | 12/1982 | Melindo | 179/18 HB |
| 4,523,056 | 6/1985 | Fisher. | |

FOREIGN PATENT DOCUMENTS 1079674  8/1967  United Kingdom ........... 179/18 BB

OTHER PUBLICATIONS

Sales Sheet, Hostagephone, Western Electric, 1 page.
Sales Sheet, QT-1 Quick Temporary Telephone, Critical Communications Systems Inc., 1 page.
Brochure, Crisisphone, Lynch Communications Systems Inc., 37 pages, letter dated 5/8/81, Ordering Info. Sheet dated 1/81, Operators Manual, ©1980.

Primary Examiner—Keith E. George
Attorney, Agent, or Firm—Eric P. Schellin

[57] ABSTRACT

A portable self-contained telephone system for use in hostage negotiation and barricade situations is disclosed. The system is powered by a battery pack or AC power source and provides telephone isolation of the perpetrator. The system can be connected into the telephone network and third parties can be dialed and connected to the perpetrator by the negotiator. The dial pad will redial the last number called at the push of a button. Conference calls between the negotiator, third-party and the perpetrator can be connected. The perpetrator's telephone can be rung automatically. The status of the perpetrator's telephone is displayed by the off hook indicator at all times.

9 Claims, 7 Drawing Figures

4,590,331

HOSTAGE NEGOTIATION TELEPHONE SYSTEM

FIELD OF THE INVENTION

This invention pertains to portable telephone systems for use in hostage negotiation situations, and other crisis or emergency situations in which a portable phone system is useful.

BACKGROUND OF INVENTION

There are many situations where it is desirable to have a portable telephone system which is independent of the public telephone lines. In a hostage negotiation or barricade situation it is imperative to isolate the perpetrator and keep him from being able to call out. It is also important to control the incoming calls. This isolation and control is best located at the site of the hostage-taking or barricade directly in the hands of police authorities. A portable, self-powered telephone system which can provide communication with the perpetrator of a hostage or barricade situation and can achieve isolation and control of the perpetrator's phone calls is therefore very valuable to public authorities. Other situations in which such a system would be useful would be, for example, in witness/dignitary protection, in bomb disposal squad communication without RF interference, and in disasters where telephones are disabled by fires, explosions and natural disasters.

BRIEF DESCRIPTION OF THE INVENTION

One of the goals of the invention is to provide a portable self-powered system through which a police negotiator can talk to a perpetrator.

Another goal is to provide in such a system means for controlling the perpetrator's calls to the outside and calls from the outside to the perpetrator.

A further goal is to provide automatic ringing circuits and circuits for remembering the last number called to a third party.

In accordance with the invention, an electronic system is provided which is compact enough to be contained in a suitcase and which is powered by a rechargeable battery pack. The authorities reconnect the standard telephone at the hostage-taking site through the invention and also connect the invention into the standard telephone network. In the alternative, a remote phone connected as part of the invention is passed to the perpetrator. Such a remote phone is rewired so that the police can always listen through it even when the phone is on the cradle. An additional headset is provided for the negotiator's coach. Additional listening capability is provided for the police command through an amplifier and speaker remotely located from the room in which the negotiator and the coach are operating the invention. A continuous ringing circuit and a dial pad which remembers the last number called are incorporated in the invention. The negotiator can call a third party or receive a call from a third party and remain in the conversation both talking and listening.

These and further constructional and operational characteristics of the invention will be evident from the detailed description given hereinafter with reference to the figures of the accompanying drawings which illustrate preferred embodiments and alternatives by way of non-limiting examples.

DESCRIPTION OF THE PREFERRED EMBODIMENT

Figure 1:
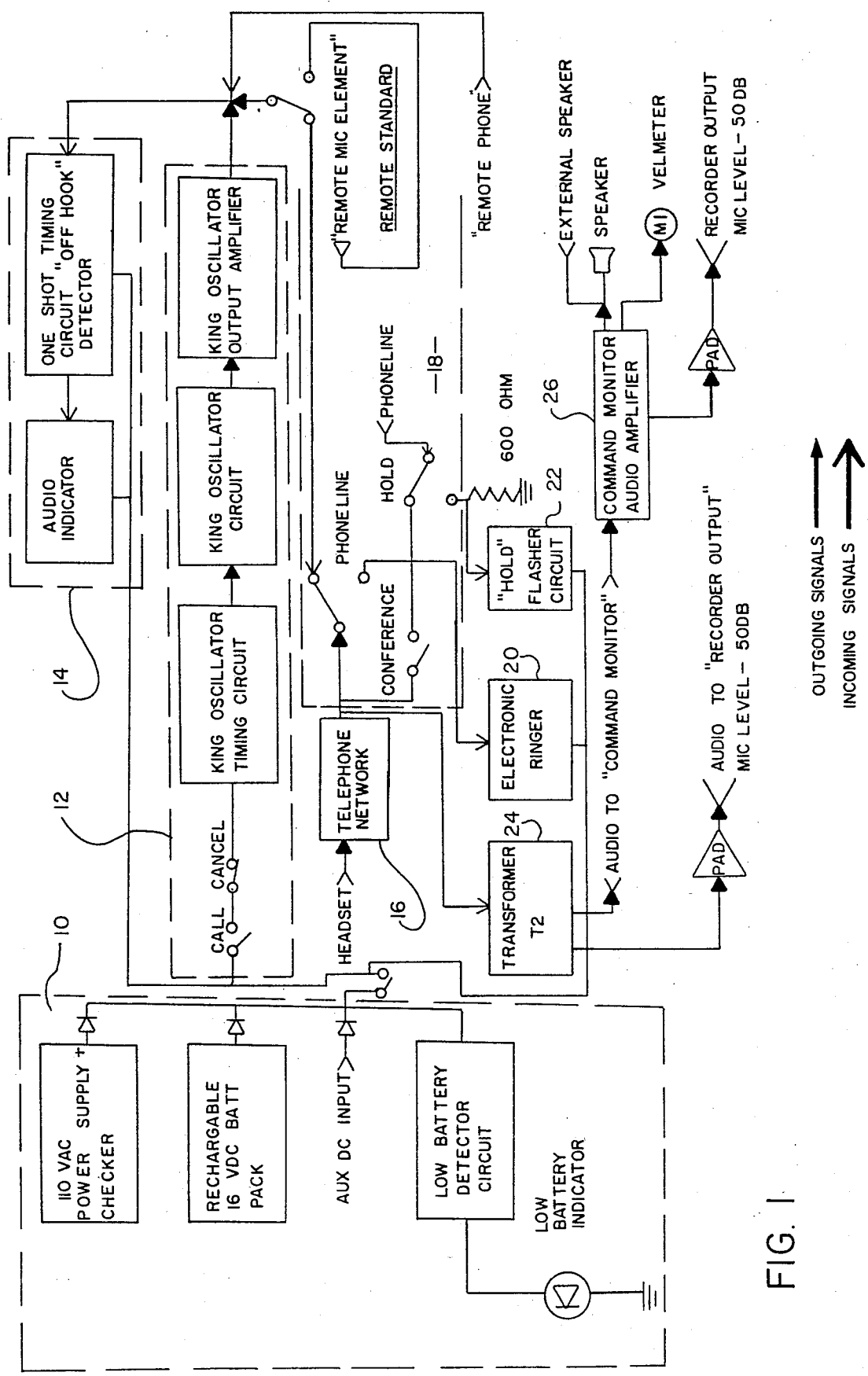
FIG. 1 shows a functional block diagram of the hostage negotiation telephone system.

Referring now to the drawings wherein reference numerals are used to designate parts throughout the various figures thereof, there is shown in FIG. 1 a functional block diagram of the system. The power supply system 10 is shown in more detail in FIG. 2. The ringing circuit 12 is composed of a ring oscillator timing circuit, a ring oscillator circuit, a ring oscillator output amplifier, a call switch and a cancel switch. The ringing circuit is used to ring the remote phone in the hands of the perpetrator. The offhook detector 14 is used to light an indicator and give a beeping signal to the negotiator when the perpetrator picks up the remote phone. The telephone network is used to mix power and audio signal to the remote phone. The simplified switching network 18 is used to switch from the standard remote phone to a special phone sent in by the authorities to the perpetrator, to connect to a 3rd party, to put a third party on hold or to set up a conference call. The symbols for switches are used in this diagram, but in detail there are switches and relays. The electronic ringer 20 rings when a third party calls in. The hold flasher circuit 22 flashes a light when a third party is put on hold. The transformer 24 is used to decouple audio signals to an audio command monitor 26 located remotely at a police command site.

Figure 2:
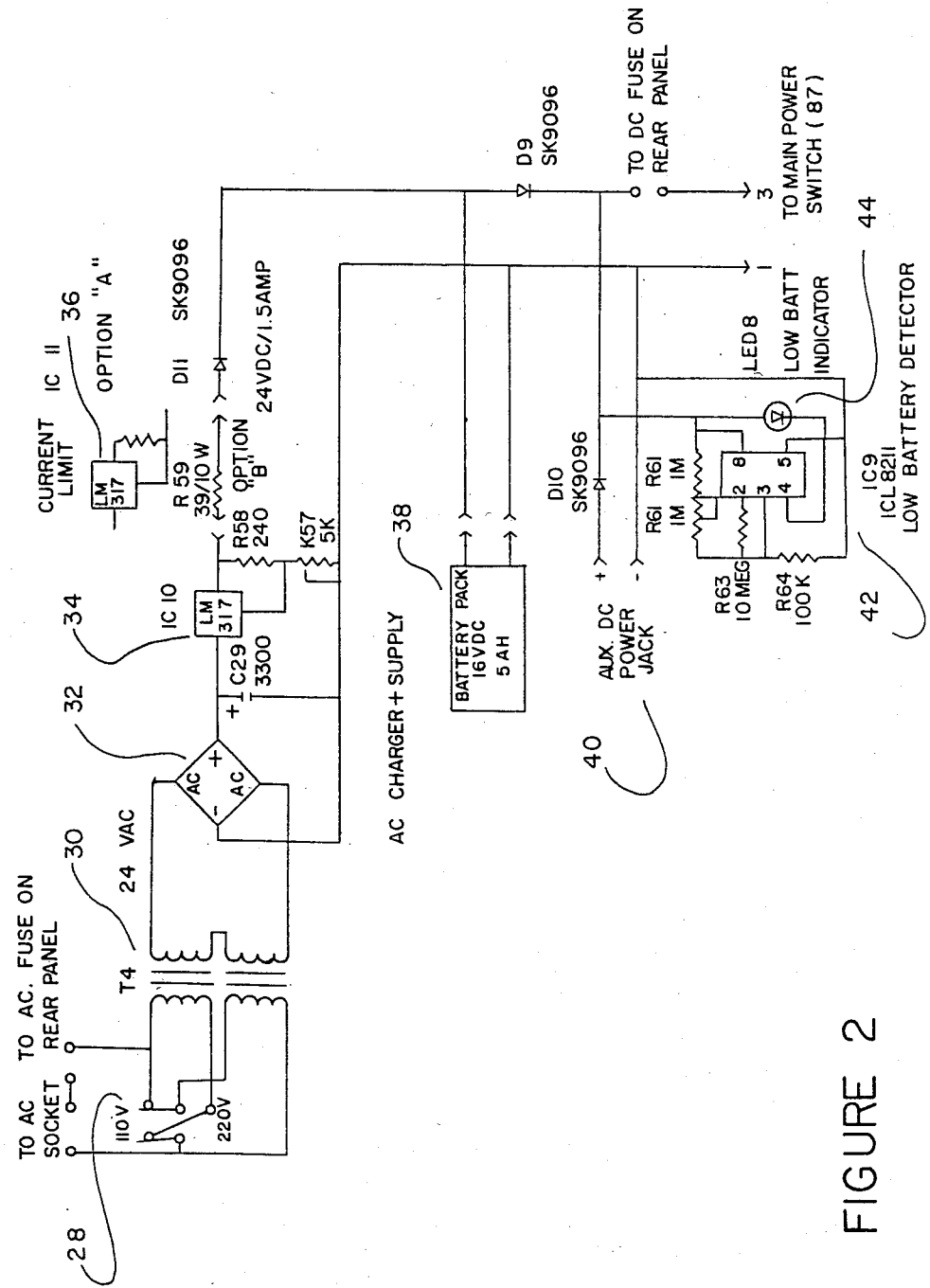
FIG. 2 shows a detailed diagram of the power supply.

Referring now to FIG. 2, there is shown at 28 a switch to enable selection of a 100 VAC or 220 VAC input power. The transformer 30 steps the input down to 24 VAC. The bridge rectifier 32 rectifies the AC power. Two alternate embodiments of current limiters at 34 and 36 are shown. Power can also be obtained from a battery pack 38 or external DC source 40. A low battery detector circuit 42 is used to light a lamp 44 when the battery is low. The diodes D9, D10 and D11 are used to block reverse flow of current.

Figure 3:
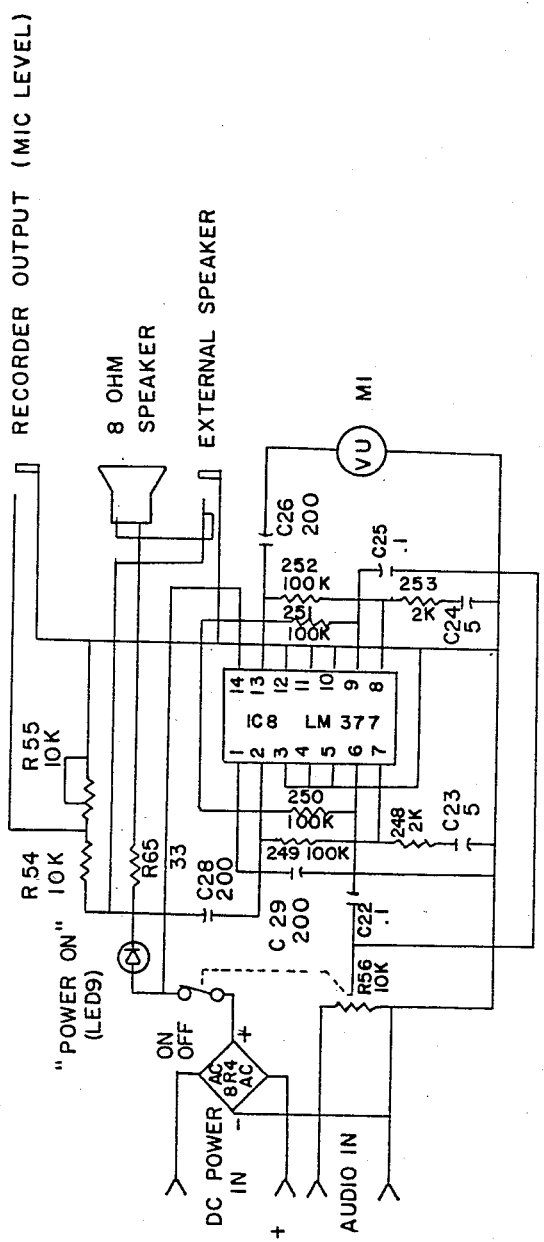
FIG. 3 shows a detailed diagram of the command monitor audio amplifier.

Referring now to FIG. 3 there is shown in detail the command monitor audio amplifier. This circuit is conventional. The use of the command monitor in a location remote from the negotiator allows the police command to hear conversations between the perpetrator, the negotiator and a third party without disturbing the negotiator.

Figure 4:
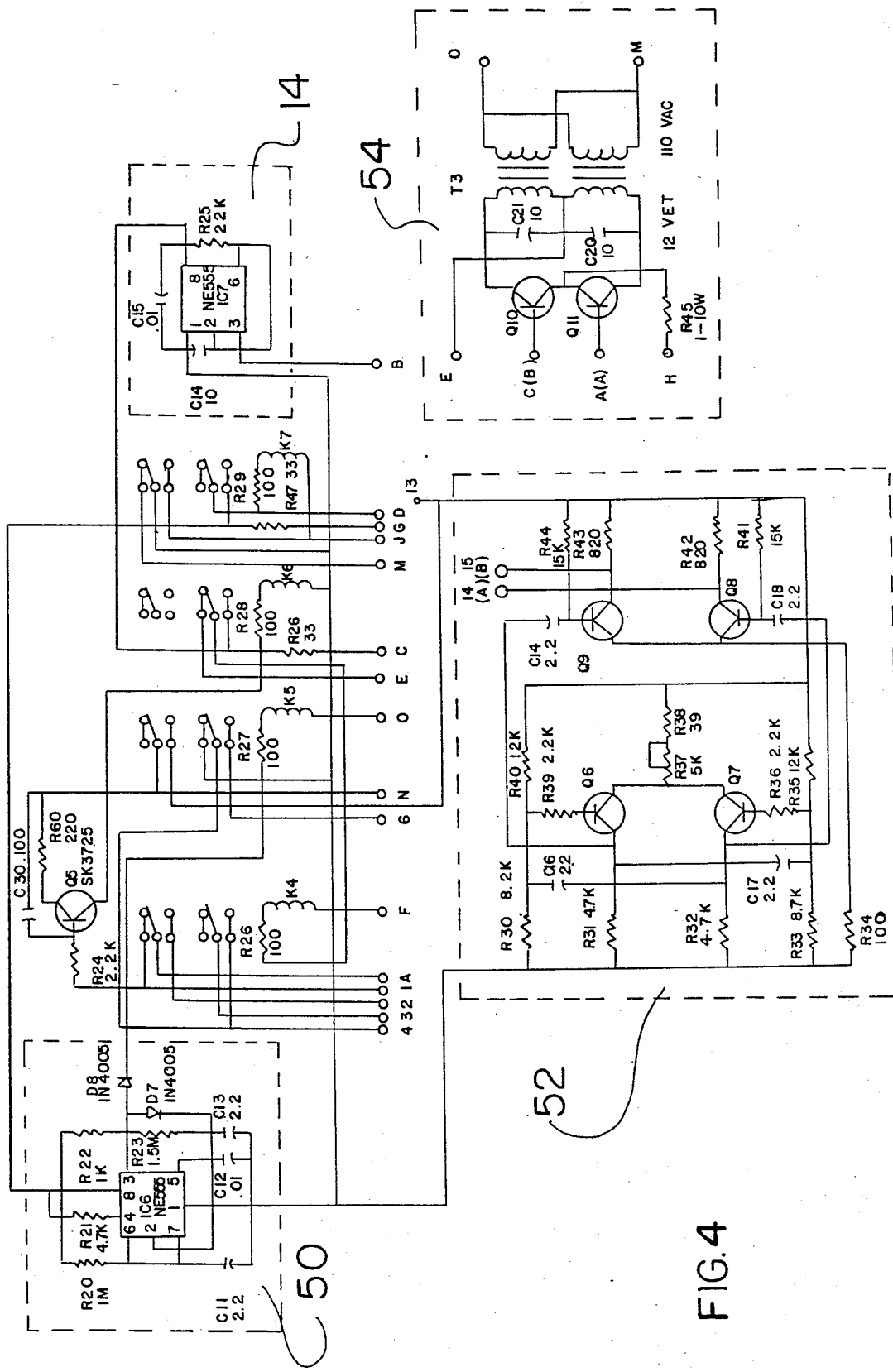
FIG. 4 shows a detailed diagram of the ring oscillator timing circuit, ring oscillator circuit and ring oscillator amplifier.

In FIG. 4 there is shown at 14 the one-shot timing circuit to indicate when the remote phone is off-hook. The ring oscillator timing circuit 50, ring oscillator 52, and ring oscillator output amplifier 54 are all conventional. The output of the ring oscillator output amplifier is a 20 hz signal at 90 v.

Figure 5:
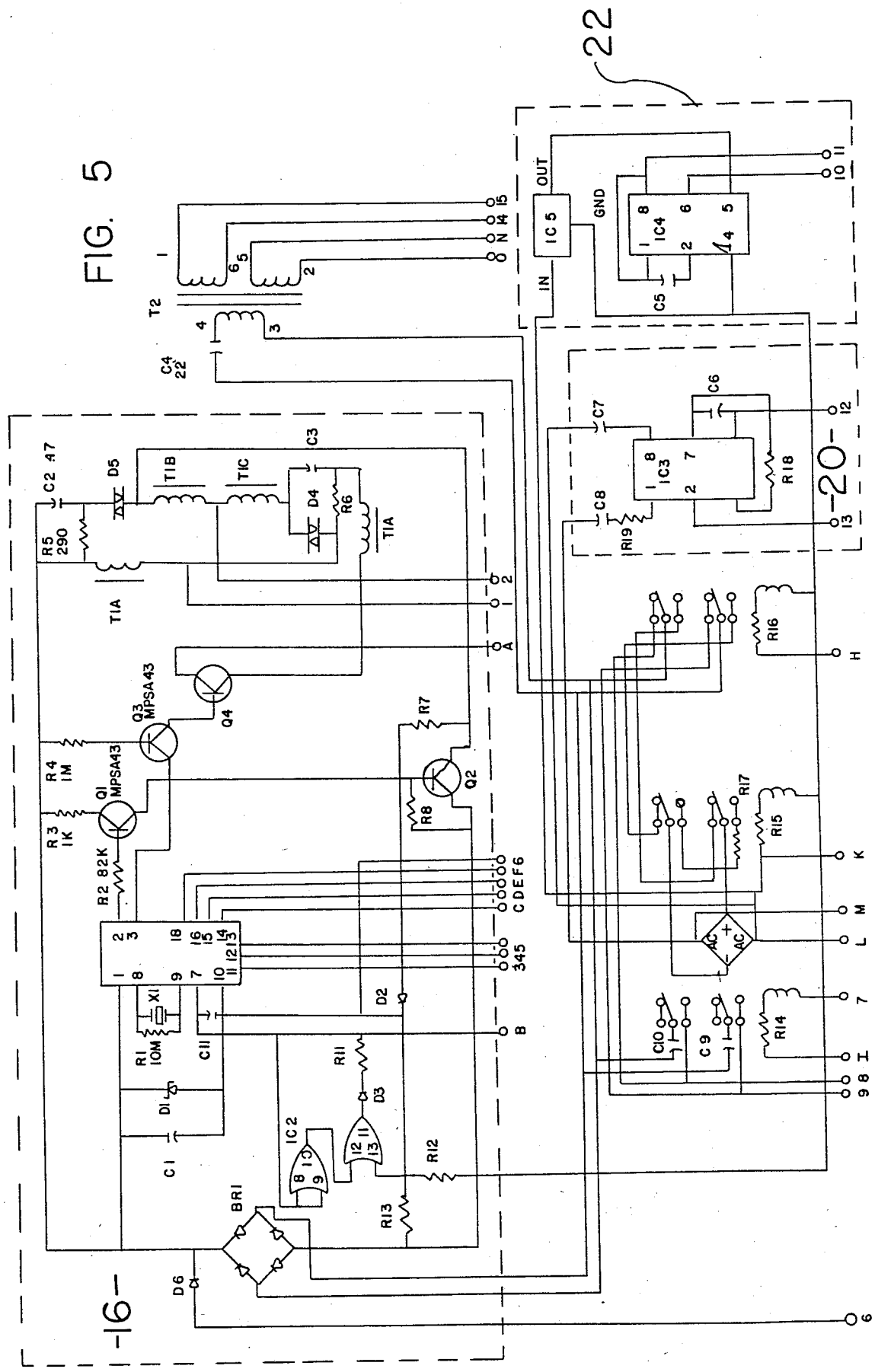
FIG. 5 shows a detailed diagram of the control board which includes the telephone network, conference circuit, phone line circuit, hold circuit, transformer, electronic ringer and hold flasher circuit as shown in FIG. 1.

In FIG. 5, the telephone network 16 includes the dialer IC1 which also retains the last number dialed. The hold flasher circuit 22 is shown at the lower right of this figure. Next to the hold flasher is shown the electronic ringer 20. The relay K1 is used to connect a conference call between the perpetrator, the negotiator and a third party. The relay K2 is used to put a third party on hold. The relay K3 is used to connect the perpetrator to a third party.

Figure 6:
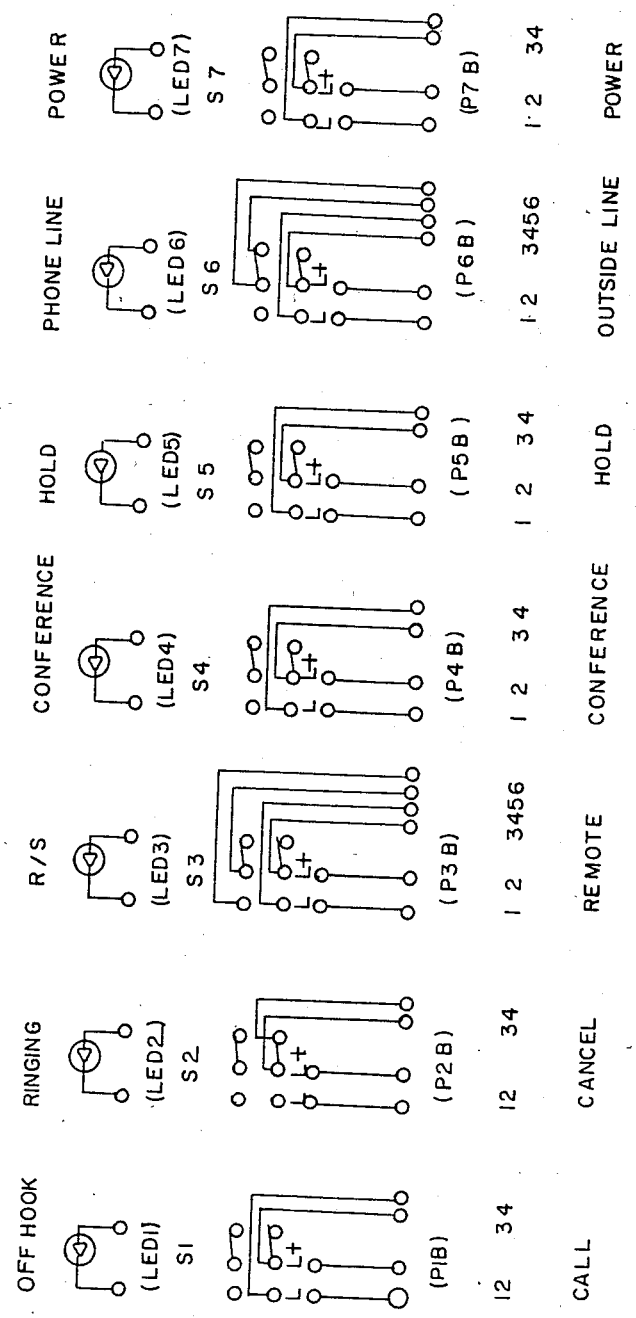
FIG. 6 shows a diagram of the front panel switches and displays.

The front panel switches and displays are shown in FIG. 6. The displays include an off-hook signal for the remote phone, a ringing signal for the remote phone, a signal which indicates whether the system is connected to the existing phone or a special remote phone, a conference signal, a hold flasher for the third party, a signal which indicates incoming third party call and a power signal. The switches include a call to the perpetrator switch which causes the remote phone to ring until answered, a cancel switch to cancel the continuous ringing, a switch to move the connection from the existing phone to a special remote phone, a conference switch, a hold switch, an outside line switch and a power switch.

Figure 7:
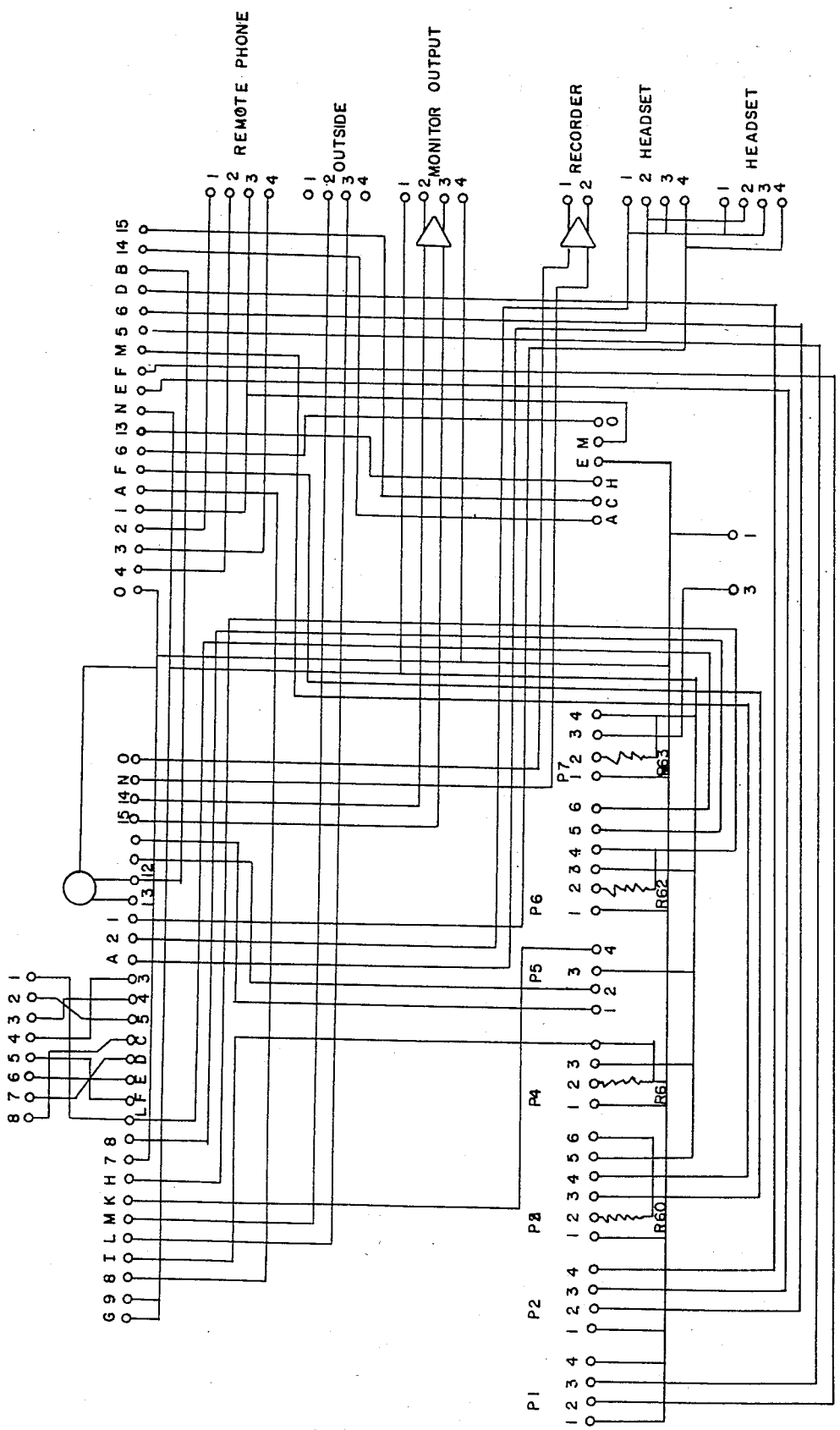
FIG. 7 shows the mother board for interconnecting the above detailed diagrams.

FIG. 7 shows the interconnection of the foregoing circuits.

THEORY OF OPERATION

When the main power switch (S7, a push on-push off switch) is activated, a DC voltage is applied to the "POWER" status lamp (LED 7), the "MONITOR OUTPUT" jack located on the rear panel and the main mother board from one of three (3) power sources.

The first source of DC power is supplied from a built-in AC power supply and charger circuit. When the unit is plugged into a 110 VAC source, the built in power supply provides 16 VDC, both voltage and current regulated, to run all electronic circuits and relays and also charge the rechargeable battery pack.

The second source of DC power is supplied by a rechargeable DC battery pack. This battery pack provides 16 VDC at a rating of 5 Amp Hours and is recharged from the built-in charging circuit.

A third source of DC power (12-16 VDC) may be supplied by way of an auxiliary DC power jack located on the rear panel.

All three sources are diode isolated from each other and fused.

The DC voltage is used to power all electronic circuits and relays and supplies a DC voltage (talk path) to the "Remote Phone" circuit.

In the event the supply voltage should fall below 11 VDC, a low battery detection circuit consisting of IC9 and associated components will activate the "LOW BATTERY" indicator (LED8) located on the rear panel.

It should be noted, that at 11 VDC, there is sufficient voltage to run the electronics and supply a DC talk path to the "REMOTE PHONE", but there is not sufficient voltage to ring the "REMOTE PHONE".

The "REMOTE TELEPHONE" is a telephone that has been attached to the telephone control box by way of the modular jack located on the rear panel marked "REMOTE PHONE". The telephone control box may also be used with any existing telephone by attaching the appropriate wiring to the "L1" and "L2" binding post also located on the rear panel just above the modular jack marked "REMOTE PHONE".

When the "CALL" switch (S1) is depressed, a (90 VAC, 20 Hz) signal is applied to the "REMOTE TELEPHONE" causing the telephone bells or electronic ringers to activate.

This is done in the following manner: the "CALL" switch (S1, a momentary contact switch) is depressed, relay (K7) energizes and latches thru one set of it's contacts to ground. The other set of contacts provides 16 VDC to the "RINGING" status lamp (LED2) and the timing circuit, which consist of IC6 and associated components. The timing circuit then duplicates a standard ringing cycle of 2 seconds "ON" and 4 seconds "OFF". During the "ON" cycle, 16 VDC is applied to relay (K5) which energizes. One set of contacts mutes the receiver of the headset plugged into the front panel jacks marked "HEAD SET". The other set of contacts applies 16 VDC to the ring oscillator 52 and to the ring oscillator output amplifier 54 located on the "OSCILLATOR OUTPUT" board. The ring oscillator 52, which consists of transistors (Q6, Q7, Q8, Q9) and associated components, produces a low level square wave, at a frequency of 20 Hz which is then sent to the ring oscillator output amplifier 54 where it is amplified by a class "A" push-pull amplifier, which consists of transistors (Q10, Q11, C20, C21) and transformer (T3) amplifies the low level square wave, 20 HZ signal, up to 90 VAC at 20 HZ.

When the telephone is answered, the "OFF HOOK" condition is detected by a sensing circuit consisting of transistor (Q5) and resistor (R24). A voltage is applied to (R24), biasing transistor (Q5) on. When (Q5) turns on, it applies 16 VDC to relay (K6), turning it on. One set of contacts provides 16 VDC to the "OFF HOOK" status up one shot timing circuit, consisting of IC7 and associated components. This timing circuit provides 16 VDC to an audio indicating device which emits a 2000 HZ signal for about 2 seconds. This audio indicating device is used in conjunction with the "OFF HOOK" status lamp to indicate the status of the "REMOTE PHONE" to the operator.

When relay (K6) energizes during the "OFF HOOK" condition, the normally closed contacts open, breaking the supply voltage feeding the latching relay (K7) and the ring oscillator timing circuit 50, thus stopping the ringing of the "REMOTE PHONE".

In the event that the "REMOTE PHONE" is not answered, the ring cycle may be terminated by depressing the "CANCEL" switch (S2, a momentary contact switch). When the "CANCEL" switch is depressed, this also breaks the supply voltage feeding the latching relay (K7) and the "RING OSCILLATOR" timing circuit, thus stopping the ringing cycle.

The "REMOTE/STANDARD" switch (S3, a push on-push off switch) energizes relay K4 and applies 16 VDC to the "REMOTE" status lamp (LED3) to indicate that the "REMOTE" feature has been engaged. This circuit is operational with any telephone that has been prewired inside the network, allowing the microphone element inside the handset to remain active even though the handset has been placed on the cradle.

When relay (K4) is energized, the contacts take two of the four wires in the interconnecting cable between the telephone control box and the "REMOTE PHONE" and applies a voltage (talk path) to the handset microphone element of the "REMOTE PHONE" and the internal telephone network of the telephone control box. This allows the monitoring of any sounds or conversations that are occuring around the "REMOTE PHONE".

To place an outside phone call, a two conductor cable must be inserted into the telephone jack marked "OUTSIDE LINE" located on the rear panel of the telephone control box. The other end of the two conductor cable must be connected to an existing, external telephone circuit.

When the "PHONE LINE" switch (S6, a push on-push off switch) is depressed, it applies 16 VDC to the "PHONE LINE" status lamp (LED6) and energizes relay (K3). Relay (K3) connects the external telephone circuit, which is connected to the telephone jack marked "OUTSIDE LINE", to the internal telephone network and dialing circuit of the telephone control box. At this time, a dial tone will come through the network. The key pad located on the front panel may be used to initiate a phone call.

By depressing the dial pad switches (0–9) the pulse dialing circuit will dial the corresponding numbers, up to 20 digits. The telephone control box will retain the last number programmed into the pulse dialing chip (IC1) as long as the power remains "ON".

To terminate a telephone call, depress the "PHONE LINE" switch again. Relay (K3) de-energizes, disconnecting the external telephone circuit from the internal telephone network of the telephone control box.

The telephone control box has the ability to place the "PHONE LINE" on "HOLD" and "CONFERENCE" the "PHONE LINE" with the "REMOTE PHONE".

After an outside phone call has been established between the telephone control box and a party on the "PHONE LINE" (which is the external telephone circuit) the "PHONE LINE" can be put on "HOLD" by depressing the "HOLD" switch, (S5, a push on-push off switch). This applies 16 VDC to IC5, a 5 VDC voltage regulator, which in turn applies 5 VDC to an LED flashing circuit, which consists of IC4 and associated components. This flashing circuit flashes the "HOLD" status lamp (LED5) which indicates that the "PHONE LINE" is on "HOLD".

The "HOLD" switch also energizes relay (K2), which takes the "PHONE LINE" and places it across a 600 ohm resistor. This resistor will maintain a "HOLD" condition on the "PHONE LINE".

To remove the "HOLD" condition, depress the "HOLD" switch again. This de-energizes relay (K2), which removes the "PHONE LINE" from across the 600 ohm resistor and places it back into the internal phone network, again establishing contact between the telephone control box and the party on the "PHONE LINE".

To "CONFERENCE" the "PHONE LINE" with the "REMOTE PHONE" depress the "CONFERENCE" switch (S6, a push on-push off switch). This applies 16 VDC to the "CONFERENCE" status lamp (LED6) and energizes relay (K1). Relay (K1) takes the "REMOTE PHONE" circuit and combines it to the "PHONE LINE" circuit thru two electrolytic coupling capacitors. These coupling capacitors are necessary in order to avoid damage to the external telephone circuit or the telephone control box due to voltage differences.

When the telephone control box is connected to an existing, external telephone circuit, it becomes the end telephone device. (It takes the place of the existing telephone). The telephone control box has an internal electronic ringing circuit, consisting of IC3 and associated components which activates an audio indicator when any incoming telephone calls are received.

Telephone coupling transformer (T2) is used to couple audio from the internal network to the "MONITOR OUTPUT" and "RECORDER OUTPUT" jack located on the rear panel of the telephone control box.

Transformer (T2) is a 600/600/600 ohm coupling transformer. The primary winding is connected to a coupling capacitor C4 and then connected to the output of the internal telephone network of the telephone control box where all audio from the internal network is detected.

One set of (T2) secondaries applies audio to an adjustable attenuating pad where the audio level is pre-set to −50 DB (mic level) before it is connected to the "RECORDER OUTPUT" jack located on the rear panel. This will allow external audio recording equipment to be attached without any special adapters or attenuating cords.

The other set of (T2) secondaries applies audio to the "MONITOR OUTPUT" jack located on the rear panel (−10 DB to 0 DB) which supplies audio to the external amplifier.

The external audio amplifier may be connected to the telephone control box, which supplies both audio and DC power, with a 4 conductor cable with modular plugs on both ends. One end of the 4 conductor cable is inserted into the "MONITOR OUTPUT" jack on the rear panel for the telephone control box and the other end is inserted into the "MONITOR INPUT" jack on the rear panel of the external audio amplifier.

The external audio amplifier monitors simultaneously, the same audio of the telephone control box.

The external audio amplifier circuit consist of IC8 and associated components. IC8 is an LM377, dual channel, 2 watt audio amplifier. One channel feeds the audio to the built in 8 ohm speaker and to an adjustable, attentuating pad where the audio level is pre-set to −50 db (mic level) before it is connected to the "RECORDER OUTPUT" jack located on the rear of the external audio amplifier.

The other channel supplies an audio signal to a "VU" meter located on the front panel of the external audio amplifier where the level of audio is indicated.

This invention is not limited to the preferred embodiments and alternative heretofore described, to which variations and improvements may be made, consisting of mechanically and electrically equivalent modifications to component parts and procedures without leaving the scope of the present patent, the characteristics of which are summarized in the following claims.

What is claimed is:

1. A telephone system for hostage negotiation or other crisis comprising:
 a self-contained power supply means;
 a microphone and speaker means for a negotiator whereby a negotiator can talk into and hear from the system;
 a receiver means for a coach whereby a coach can hear from the system;
 a telephone dialing means which stores a last telephone number called and is capable of retransmitting said last number called at the push of a button;
 an automatic interrupted telephone ringing means for ringing a perpetrator's telephone by a single push of a button;
 an off hook detector which senses if the perpetrator's telephone is off hook and generates an off hook signal in response thereto, the off hook signal is directed to the automatic interrupted telephone ringing means for switching off the ringing means;

an off hook indicator means for alerting a negotiator that the perpetrator's telephone is off hook in response to the off hook signal;

means for connecting said system to a standard telephone at a hostage-taking site for use as the perpatrator's telephone;

means for connecting said system to a telephone line to a local telephone network;

means for connecting together the microphone and speaker means, the perpatrator's telephone and the telephone line to form a conference call between a negotiator, a perpetrator and a third-party; and means for mixing audio signals and power to the system.

2. The system of claim 1 in which said microphone and speaker means for a negotiator is a headset.

3. The system of claim 1 in which said receiver for a coach is a headset.

4. The system of claim 1 in which the self-contained power supply means is a 16 volt rechargeable battery pack.

5. The system of claim 1 including a remote telephone for alternate use as the perpatrator's telephone comprising a handset and a cradle connected to said system and conveyed to a site of a hostage-taking and means for selecting between said remote telephone and said standard telepone connecting means.

6. The system of claim 5 in which said remote telephone is wired to transmit sound when said handset is in said cradle.

7. The system of claim 1 including a remote audio amplifier and speaker connected into said system whereby a police command can hear all conversations in said system.

8. The system of claim 1 including means for putting a third-party who calls into said system or is called by a negotiator on hold.

9. The system of claim 1 including a light which indicates that a third-party is on hold.

* * * * *